United States Patent [19]

Häcker

[11] Patent Number: 4,749,193

[45] Date of Patent: Jun. 7, 1988

[54] DEVICE FOR OPENING AND CLOSING THE TOP OF A MOTOR VEHICLE

[75] Inventor: Walter Häcker, Hemmingen, Fed. Rep. of Germany

[73] Assignee: Dr. Ing. h.c.F. Porsche Aktiengesellschaft, Stuttgart, Fed. Rep. of Germany

[21] Appl. No.: 45,190

[22] Filed: Apr. 30, 1987

Related U.S. Application Data

[63] Continuation of Ser. No. 721,772, Apr. 10, 1985, abandoned.

[30] Foreign Application Priority Data

Apr. 10, 1984 [DE] Fed. Rep. of Germany ....... 3413380

[51] Int. Cl.[4] ........................... B60J 7/12; B60J 7/185
[52] U.S. Cl. .................................... 296/107; 296/121; 296/117; 296/224; 292/DIG. 5; 318/626; 340/52 D; 307/10 R
[58] Field of Search ............... 296/107, 120 R, 120 A, 296/121, 117, 115, 112, 223, 224; 292/201, DIG. 5; 307/10 R; 318/470, 596, 626; 180/286; 340/52 D

[56] References Cited

U.S. PATENT DOCUMENTS

| | | | |
|---|---|---|---|
| 2,741,503 | 4/1956 | Thompson, III | 292/201 |
| 2,761,121 | 8/1956 | Caporale | 340/52 D |
| 2,770,489 | 11/1956 | Garvey et al. | 296/117 |
| 2,895,764 | 7/1959 | Himka et al. | 296/117 |
| 2,916,327 | 12/1959 | Gilson | 296/120 R |
| 3,089,719 | 5/1963 | Csizmansky | 296/120 R |
| 3,375,037 | 3/1968 | Hunt, Jr. | 296/117 |
| 3,425,742 | 2/1969 | Rauber, Jr. | 296/121 |
| 3,649,960 | 3/1972 | Severn | 340/52 D |
| 3,779,332 | 12/1973 | Snitgen | 180/286 |
| 4,191,068 | 3/1980 | Jardin et al. | 74/625 |
| 4,196,415 | 4/1980 | Haar et al. | 340/88 |
| 4,203,039 | 5/1980 | Pritchard | 307/10 R |
| 4,278,922 | 7/1981 | Grebe | 296/223 |
| 4,465,997 | 8/1984 | Hines | 340/542 |
| 4,664,436 | 5/1987 | Eyb | 296/121 |

FOREIGN PATENT DOCUMENTS

| | | |
|---|---|---|
| 1076508 | 2/1960 | Fed. Rep. of Germany ... 296/120 A |
| 3328193 | 3/1984 | Fed. Rep. of Germany . |
| 3329717 | 4/1984 | Fed. Rep. of Germany . |
| 2533175 | 3/1984 | France . |

*Primary Examiner*—Dennis H. Pedder
*Attorney, Agent, or Firm*—Barnes & Thornburg

[57] ABSTRACT

Apparatus for opening and closing a convertible top of a motor vehicle includes an electric drive for moving the top between fully opened and fully closed position, electrically powered locking mechanisms for locking the top into the fully closed position, position sensors for sensing the locked and unlocked positions of the locking mechanisms, and a control circuit for the top drive system and locking mechanisms. The control circuit prevents the top drive system from attempting to open or close the top when the locking mechanisms are in other than a fully unlocked position. The system further includes limit switches located in the proximity of the locking mechanisms for indicating to the control circuit when the top is in the fully closed position, a terminal switch for providing a signal to the control circuit when the top is in the fully opened position, and a manually operated key for initiating unlocking/opening and closing/locking operations. The control means includes a memory element for indicating a preceding locking or unlocking operation of the locking elements, and a logic circuit for processing signals received from the manual operating key, the terminal switch, the limit switches, the position sensors and the memory mean to produce control signals for controlling the operation of the apparatus such that locking and unlocking of the locking mechanism occurs only when the top is in the fully closed position and such that opening and closing of the top occurs only when the locking mechanisms are in the fully unlocked position. Alternative embodiments of the control circuit include a hard-wired logic circuit, or a microprocessor-based system which is programmed to accomplish the control functions implemented by the hard-wired system.

37 Claims, 6 Drawing Sheets

DEVICE FOR OPENING AND CLOSING THE TOP OF A MOTOR VEHICLE

This is a continuation, of application Ser. No. 721,772, filed Apr. 10, 1985, now abandoned.

BACKGROUND AND SUMMARY OF THE INVENTION

This invention relates to a apparatus for opening and closing a convertible top for an automotive vehicle.

This application is related to U.S. patent application Ser. No. 721,771, filed Apr. 10, 1985, now U.S. Pat. No. 4,664,436 entitled "Locking Device for an Automobille Top" by Wolfgang Eyb. The subject matter of that application, which is commonly owned with the present application, is hereby incorporated by reference into the present application.

In spite of all mechanical aids known in the present state of the art, opening and closing a manually operated convertible top is a cumbersome procedure. For example, during the opening step, the driver must first enter the vehicle and release the locking means for the top at the windshield frame; then he must alight again from the vehicle, fold back the top, and fix it in place. The desire for greater operating convenience and safer operation demands automation of the procedure.

German Unexamined Published Patent Application No. 1,925,227 discloses an apparatus for opening and closing the top of a convertible wherein the top is pivoted by means of an electric-hydraulic drive mechanism. Locking elements of this apparatus are designed so that they interrupt current to the electric-hydraulic drive mechanism until all locking elements have been released.

However, with this apparatus, the top still must be released and locked, respectively, by hand. There is no provision for turning off the electric-hydraulic drive mechanism once the final positions have been reached, so there exists the possibility of bending the top linkage out of shape. Furthermore, the disclosure mentions only an additional manual unit for securing the fully opened top in its position. Furthermore, hydraulic drive mechanisms require complicated systems for pressure monitoring and pressure regulation and no emergency operation is afforded. Finally, hydraulic drive mechanisms are expensive and difficult to maintain due to the almost unavoidable occurrence of leaks.

A convertible vehicle top having an electric drive unit is known from U.S. Pat. No. 2,770,489 wherein the top is pivoted by means of an electric motor and electro-magnetically releasable spring snap locks are used for locking the top in place. The pivoting mechanism is driven by means of several electric motors, the electric motors of the main drive means being synchronized with one another via flexible shafts and being provided with an auxiliary drive and an electromagnetic spring energy brake. The final or end positions of the pivoting mechanism are monitored by terminal position switches, the signals of which act on the control circuits of the relays which control the operation of the motors, the electromagnets of the brakes, and the locking mechanisms.

Although this arrangement eliminates the above-mentioned disadvantages, it does not provide for a signal acknowledging a completely performed locking or unlocking operation to the control unit and/or to the operator. Therefore, malfunctions occur, causing damage to the top mechanism. Moreover, the electrical control for this system is extremely complicated, fragile, cumbersome and expensive. Furthermore, it occupies a large amount of space.

Therefore, it is an object of this invention to provide a device for opening and closing a top for a motor vehicle, which device affords good operating convenience and effects the process of opening the top from the unlocking step to the complete unfolding, and the process of closing the top from swinging it closed to the full locking step, without any additional manipulation and solely by activating a single operating key, wherein all movements and conditions of the device are controlled and regulated so that damage to the device can be eliminated with a high degree of certainty. Furthermore, the device is simple and inexpensive to manufacture; it is easy to mount and adjust; and it is rugged, maintenance-free, and occupies a small amount of space.

These and other objects are attained in an apparatus for opening and closing a convertible top for a motor vehicle, which comprises an electric drive mechanism for operably moving the convertible top to fully open, fully closed, and intermediate positions, locking mechanisms located in a frame member of the top and cooperating with mountings in a windshield frame of the motor vehicle for locking the top in the fully closed position, and control circuitry for controlling the operation of the electric drive mechanism of the top and the locking mechanisms. The locking mechanisms preferably include an electric motor drive for moving the locks to fully locked and fully unlocked positions. The locking mechanisms further include position sensors for providing an indication of when the lock is in the fully locked, fully unlocked and intermediate positions. The control circuitry is connected to the electric drive mechanism of the top, the electric drive motor of the locking mechanisms and the position sensors. The control circuitry prevents operation of the top drive mechanism when the locking mechanisms are in a position other than the fully unlocked position.

The apparatus of the present invention further comprises limit switches located in proximity to the locking mechanisms and connected to the control circuitry, for providing a signal to the control circuitry when the top is in the fully closed position. The apparatus also includes a terminal switch for providing a signal to the control circuit when the top is in the fully open position. A manually operated key is provided for initiating locking and unlocking operations and closing and opening operations of the locking mechanisms and top, respectively.

The control circuitry includes a memory element for indicating a preceding locking or unlocking operation of the locking mechanisms. The control circuitry also includes processing means for processing signals from the manually operated key, the terminal switch, the limit switches, the position sensors and the memory element, and for producing control signals for controlling the operation of the top such that locking and unlocking of the locking mechanisms occur only when the top is in the fully closed position, and such that opening and closing of the top occurs only when the locking mechanisms are in the fully unlocked position. The control circuitry produces signals which interrupt the locking and unlocking operations when the fully locked and fully unlocked positions are reached, and which interrupt the opening and closing of the top when the fully opened and fully closed positions are reached. The operations of the top and locking mechanisms are interruptible and/or reversible by the operator at any time by means of the manually operated key.

A preferred embodiment of the control circuitry includes a logic circuit for processing the various signals to produce the control signals for operating the top drive and locking mechanisms. An alternative preferred embodiment includes a microprocessor for performing the functions of the logic circuit and, optionally, the functions of filter circuits and other components of a hard-wired control circuit.

The advantages primarily attained by this invention are that, by simple and economical means, a device has been created for opening and closing an automotive vehicle top, which entirely automates the process of opening and closing the top, permits safe operation without danger of damage, and moreover is rugged and service-free. By means of this device, a considerable improvement in operating convenience is achieved, and erroneous operations are prevented.

BRIEF DESCRIPTION OF THE DRAWINGS

The invention is illustrated, by way of example, in the drawings and will be described below in greater detail with reference thereto.

In the drawings

DETAILED DESCRIPTION OF THE DRAWINGS

Figure 1:
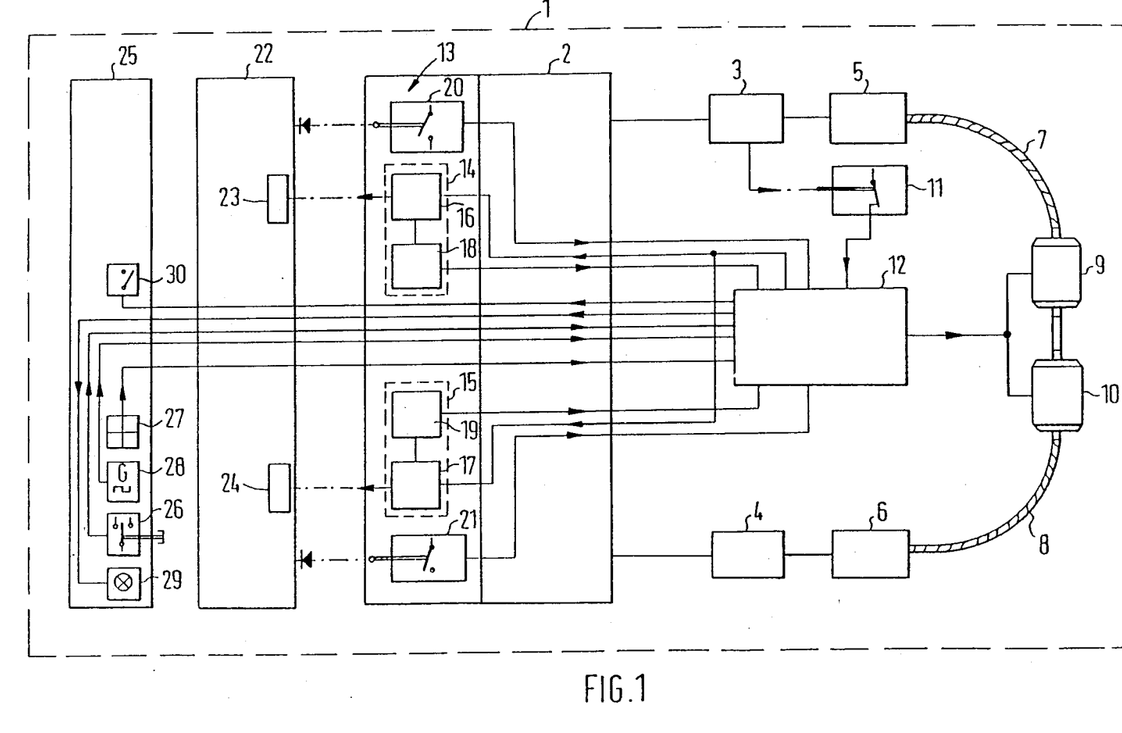
FIG. 1 is a schematic representation of the device of this invention, illustrating the structure and function thereof.

In FIG. 1, a body of a vehicle is denoted by 1. A top 2 is pivoted by means of swinging levers 3, 4 operated by self-locking gearing units 5, 6. The gear mechanisms 5, 6 are driven by way of flexible shafts 7, 8 fixedly mounted for rotation to the shaft ends of preferably two electric motors 9, 10 rigidly coupled directly to each other.

The electric motors 9, 10 are advantageously accommodated in a central position in the rear area of a vehicle, for example, behind the rear seat or in the trunk. Therefore, the space requirement for the top drive mechanism in the rear of the automotive vehicle, which in most cases suffers from cramped space conditions, is small.

The flexible shafts 7, 8 can, of course, also be driven by only one electric motor if this motor has sufficient power and can be accommodated in the available space.

A terminal switch 11, operated by the swinging lever 3 or 4 or some other part of the top 2, signals to a control unit 12 that the top is in its entirely swung-out (opened) condition.

Locking elements 14, 15, arranged in a forward top frame section 13, comprise electric motor drive mechanisms 16, 17 and position sensors 18, 19 which indicate their position to the control unit 12. Limit switches 20, 21 are mounted in the proximity of locking elements 14, 15, preferably in the outside lateral region. These limit switches signal control unit 12 when the forward top frame section 13 contacts a windshield frame 22 (i.e., when the top is in the fully closed position).

Mountings 23, 24 are attached to the windshield frame 22. These mountings are engaged, during the locking operation, by locking elements 14, 15 so that the top 2 is pulled against and locked to the windshield frame by these locking elements.

A manual operating key 26 is arranged in a dashboard 25 and is used by the driver of the vehicle for signaling the control unit to open or close the top. This procedure is, at any time, reversible and/or interruptible.

The control unit 12 receives additional signals from an ignition lock 27 and/or from a tachometer pulse generator 28. The control unit 12 informs the driver by way of an optical and/or acoustic indicator 29 when the top is in its fully locked and/or fully opened position, or in any desired intermediate position. Furthermore, a switch 30 which is connected to and actuated by the control unit, can be provided which will, for example, interrupt the ignition current, trigger blocking means for blocking the ignition lock in the accessory or radio position, block the transmission in its parking or idling (neutral) position, and/or block the hand brake in its engaged condition when the top is not in its fully locked and/or fully opened position.

As can be seen from FIG. 1, the electric motors 9, 10 the electric motor drive mechanisms 16, 17 of the locking elements 14, 15, the optical and/or acoustic indicator 29, and the switch 30 are actuated directly by the control unit 12.

The drive mechanism for the top and the locking elements are suitably designed for activation in an emergency operation. It is possible to arrange at control unit 12 mechanical pushbutton switches, by means of which the electric motors 9, 10 and the electric motor drive mechanisms 16, 17 can be directly activated, circumventing the electronic system in control unit 12, while maintaining overcurrent protection means in the circuit. Control unit 12 in this case must, of course, be arranged in an accessible location in the vehicle.

It is also possible to provide for mechanical operation of the free or exposed shaft ends of electric motors 9, 10 and of the electric motor drive mechanisms 16, 17 by means of a tool (e.g., a crank ratchet wrench), or that the self-locking action of the gear means 5, 6 can be released.

Figure 2:
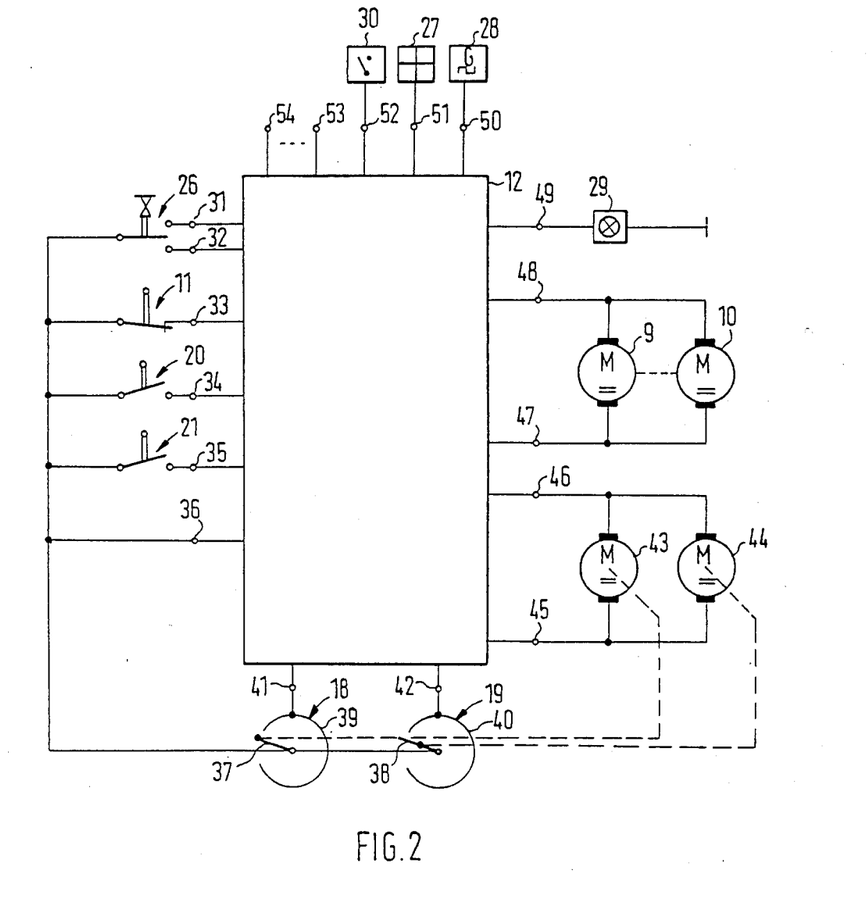
FIG. 2 is an electrical circuit diagram, in principle, of the parts of the device according to the invention, connected to a control unit.

FIG. 2 shows how the individual electrical devices are interconnected. Referring to control unit 12, the circuit components (i.e., the manual operating key 26, the terminal switch 11, and the two limit switches 20, 21) connected to terminals 31–35 are supplied with operating current by way of a terminal 36, as are movable pickups 37, 38 of position sensors 18, 19, which pickups are, connected for rotation with the electric motor drive mechanisms 16, 17. The contact paths 39, 40 of the position sensors are connected to control unit 12 via terminals 41, 42. Electrical contact between the movable pickups and the contact paths in this arrangement is interrupted in both end positions and is otherwise maintained.

The electric motors 43, 44 of the right and left locking elements 14, 15 are connected electrically in parallel and can be supplied via a pair of terminals 45, 46 with a voltage of changing polarity to reverse their direction of movement. The mechanically coupled electric motors 9, 10 for driving the top swinging mechanism are likewise connected in parallel and can be supplied, by means of terminals 47, 48, with a voltage of changing polarity. The optical and/or acoustic indicator 29, the tachometer pulse generator 28, the ignition lock 27, and the switch 30 are connected to the control unit 12 by way of terminals 49-52. Additional terminals, for example 53, 54, serve for current supply and optionally permit additional feeding of input and output data.

Figure 3:
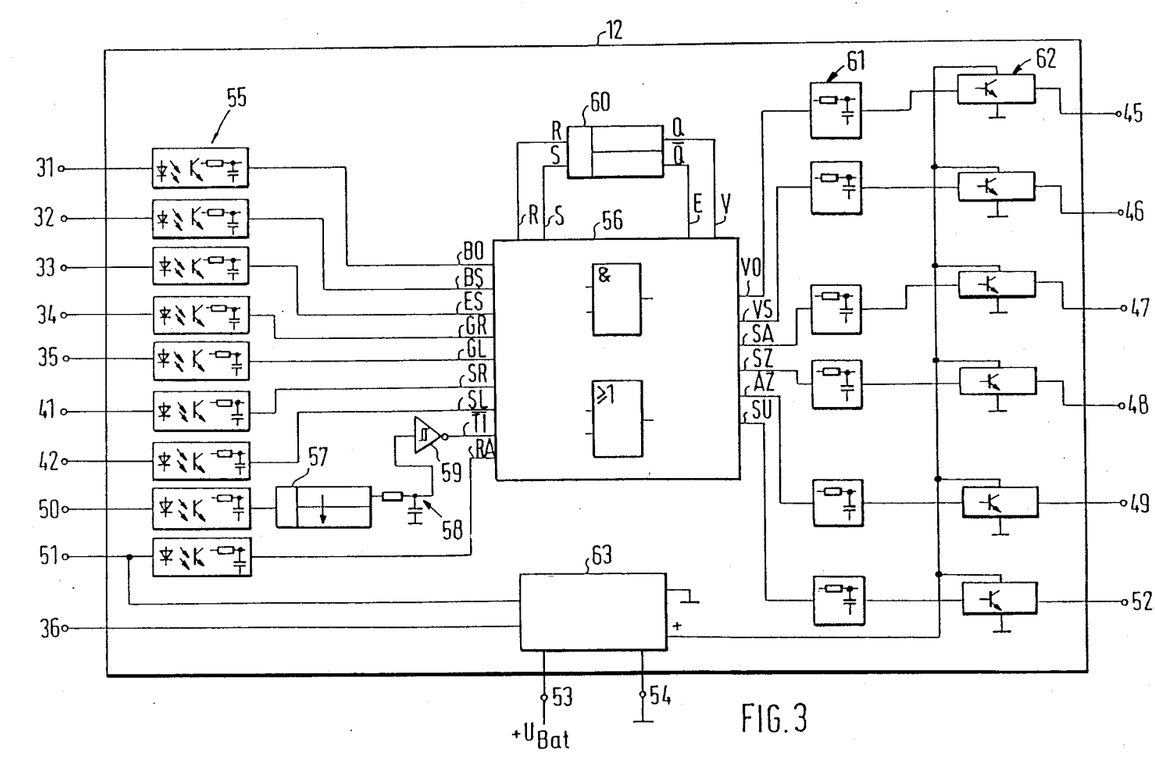
FIG. 3 is a schematic view of the control unit.

An embodiment of control unit 12 is shown in schematic form in FIG. 3. Input data terminals 31-35, 41, 42, 50 and 51 are connected to a logic circuit 56 by coupling modules 55 which are symbolically illustrated and which serve essentially for signal matching, signal processing, signal separation and/or noise suppression (e.g., to eliminate the effects of contact bounce or chatter).

Additionally, a circuit is provided between the coupling component associated with terminal 50 and logic circuit 56, which circuit transmits blocking signal to logic circuit 56 only if the pulse frequency corresponds to a vehicle speed of greater than 3 km/h, and may advantageously comprise a series circuit of a retriggerable monostable multivibrator 57, an RC circuit 58 and a Schmitt trigger 59, although it is possible to design the noise suppressing circuitry in the coupling module so that at least the monostable multivibrator 57 and the RC circuit 58 can be omitted. A memory element 60, actuated by logic circuit 56 and advantageously designed as an R-S flip-flop, indicates to the logic circuit a preceding locking and/or unlocking operation. The logic circuit 56 actuates, by way of noise-suppressing circuits 61, output drive circuits 62; the noise-suppressing circuits 61 prevent undefined output conditions of the logic circuit, as might occur after turning on the power supply or after a change in the input signals, from being transmitted to the output drive circuits.

The output drive circuits 62, which preferably comprise devices such as power transistors and electronic switches or relays, supply terminals 45 and 46 or 47 and 48, respectively, with a voltage of changing polarity depending on the control signal combination applied, or they effect a short-circuiting condition which results in braking action by the electric motors. In the actuated condition, the outputs of the drive circuits are connected to a positive operating voltage and, in the inactive condition, to the vehicle frame (i.e., a negative operating voltage).

Terminals 49 and 52, upon application of the proper control signals, are directly connected to a positive operating voltage by output drive circuits 62 and are otherwise isolated or connected to ground. It is especially advantageous for the output drive circuits to include overcurrent protection circuits, preferably of an electronic type, to protect the device from damage in the event of malfunctions in the load current circuit and/or in the mechanical system, such as is described in German Unexamined Published Patent Application No. 3,138,645. Finally, a power supply unit 63 is provided in addition to the above. The connection lines from this unit to the individual elements of control unit 12 have been substantially omitted for the sake of clarity.

Figure 4:
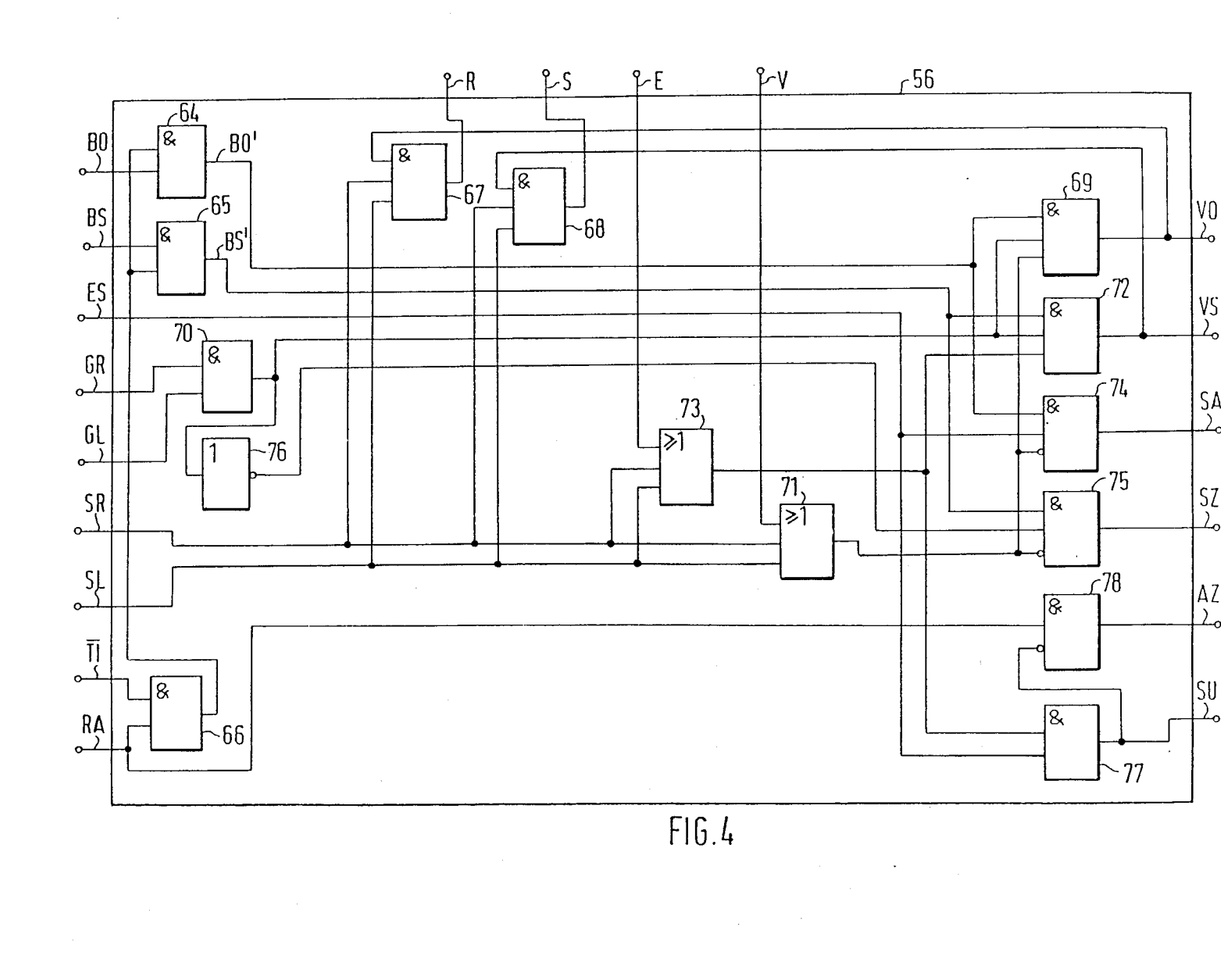
FIG. 4 is a schematic view of a logic circuit for the control unit.

FIG. 4 shows an embodiment of logic circuit 56, the external wiring of which is shown in FIG. 3. The input signals are as follows (the corresponding terminals of the control unit are indicated in parentheses):

BO—Open operating key (31)
BS—closed operating key (32)
ES—terminal switch, normally closed (33),
GR—limit switch on the right side of the top frame; normally open (34)
GL—limit switch on the left side of the top frame, normally open (35),
SR—contact path of the right side position sensor, open at both end positions (41),
SL—contact path of the left side position sensor, open at both end positions (42),
TI (not TI)—tachometer pulse generator, $\overline{TI}$ is a blocking signal generated upon the occurrence of tachometer pulses (50),
RA—radio or accessory position of the ignition lock (51),
E—memory output, previous unlocking motion ($\overline{Q}$ of memory element 60),
V—memory output, previous locking motion (Q of memory element 60)

Output signals of the logic circuit are:
R—resetting input, memory element 60
S—setting input, memory element 60
VO—open locking elements (45),
VS—close locking elements (46),
SA—swing top open (47),
SZ—swing top closed (48),
AZ—optical/acoustic indicator (49),
SU—operate switch (52)

The operating key signals BO and BS are connected as inputs to AND gates 64 and 65, which produce respective signals BO' and BS' only if signals RA and $\overline{TI}$ are present at the inputs to AND gate 66.

The resetting signal R is produced by AND gate 67 only if signals SR, SL and VO are present at the inputs of gate 67.

The setting signal S is produced by AND gate 68 only if signals SR, SL and VS are present at the inputs of gate 68.

An AND gate 69 actuates the locking elements in the opening direction (i.e., by producing signal VO) only if operating key signal BO' is present at the input, along with a signal from AND gate 70 indicating that both limit switches 20 and 21 are closed (signals GR and GL), and a signal from an OR gate 71, indicating the presence of at least one of the signals V, SR or SL.

An AND gate 72 actuates the locking elements in the closing direction (i.e., by producing signal VS) only if operating key signal BS' is present at the input, along with the signal from AND gate 70 and a signal from an OR gate 73, indicating the presence of at least one of the signals E, SR or SL.

An AND gate 74 actuates the top drive mechanism in the opening direction by producing signal SA only if operating key signal BO' and signal ES are present and a signal from OR gate 71 is not present, at the respective inputs of gate 74.

An AND gate 75 actuates the top drive mechanism in the closing direction by producing signal SZ only if operating key signal BS' and a signal from invertor 76, which inverts the output of AND gate 70, are present, and a signal from OR gate 71 is not present, at the respective inputs of gate 75.

The switch 30 is actuated by signal SU only if an ES signal and a signal from OR gate 73 are simultaneously present at the inputs of AND gate 77.

The optical and/or acoustic indicator 29 is actuated by AND gate 78 via signal AZ only if an RA signal is present, and an SU signal from AND gate 77 is not present, at the inputs of gate 78.

Figure 5:
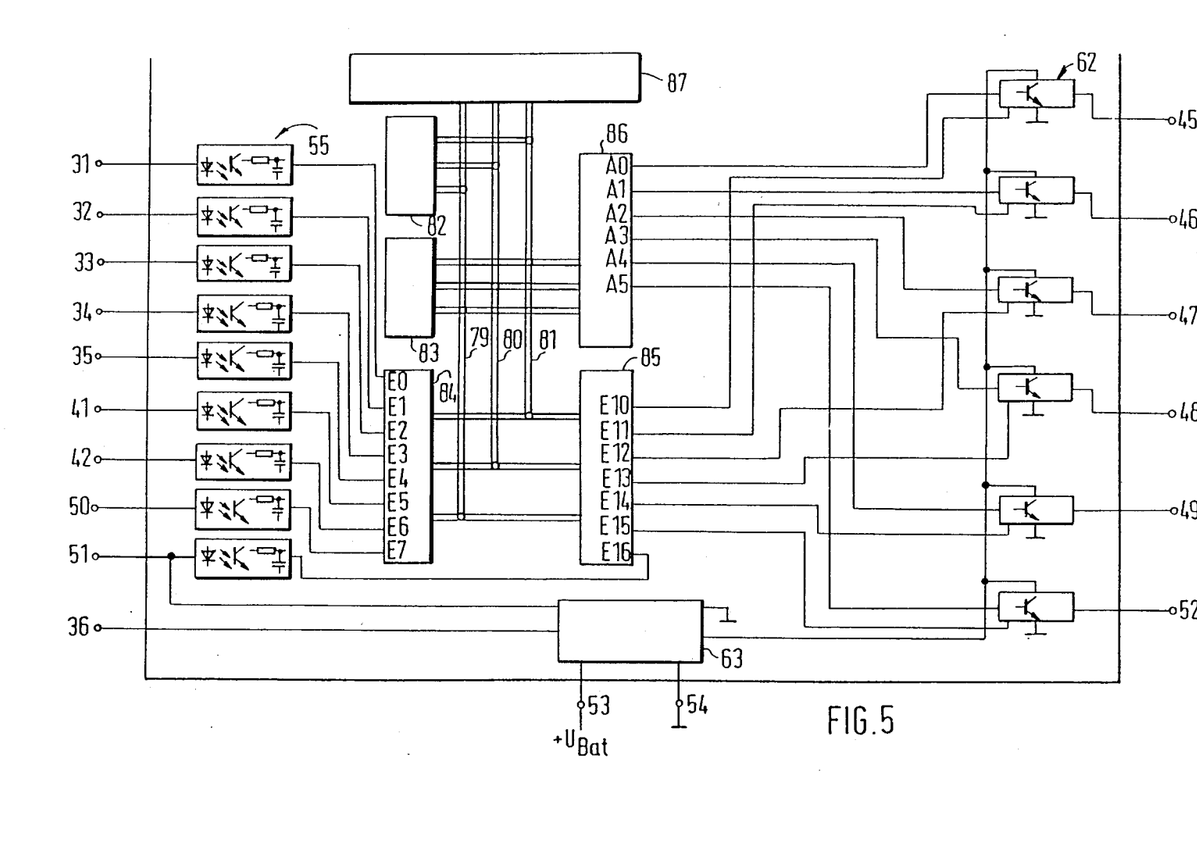
FIG. 5 is a schematic view of a control unit which includes a microprocessor.

Through the use of a microprocessor for solving the control problem as shown in FIG. 5, further improvements in control unit 12 are obtained with a relatively small expenditure in hardware components. It is thereby possible, for example, to better monitor the functions of the entire system, to insert a self-testing function to monitor the output drive circuits (e.g. regarding response of the electric overcurrent protection), and to produce error signaling in the event of a malfunction in the system. Signaling of the occurrence of an error can be implemented, for example, by an intermittent indicator (e.g., alternating actuation and deactuation of the optical and/or acoustic indicator 29). Finally, the undefined state of the memory element or elements, critical during a transient power cutoff, can be easily controlled, for example, by bringing the memory contents into a defined state after the power outage by means of an initializing program. By a time-limited actuation of the locking elements in both directions, it is possible to determine their position (fully unlocked or fully locked) without damaging the system. Furthermore, the system can be expanded by incorporating an error diagnosing system to simplify trouble-shooting by servicing personnel.

Besides the coupling modules 55, the output drive circuits 62 and power supply unit 63, which are also found in the embodiment shown in FIG. 3, the embodiment of control unit 12 in FIG. 5 includes microprocessor 87. The control bus 79, address bus 80 and data bus 81 of microprocessor 87, are connected to a program memory (ROM) 82, a working memory (RAM) 83, first and second parallel input buffers 84 and 85, and an output buffer 86. With the use of a single-chip microprocessor, some reductions in components can be achieved.

Additional parts required for the operation of the microprocessor, such as a clock pulse generator, a power supply, etc., have been omitted for the sake of clarity. It should be noted that the coupling modules can be of a simpler structure in certain cases, especially when the contact anti-chattering feature is optionally provided in the programming or software.

The terminals 31–35, 41, 42 and 50 are connected by coupling modules 55 to inputs E0 through E7 of first parallel input buffer 84. Terminal 51 is connected by a coupling component 55 to input E 16 of second parallel input buffer 85.

The output drive circuits 62 are actuated by outputs A0 to A5 of output buffer 86. These output drive circuits supply load current to the terminal pairs 45, 46 and 47, 48 and the terminals 49 and 52 when activated, and isolate the terminals or connect the terminals to ground when not activated. A response of the overcurrent protection means of the output drive circuits 62 is detected, for example, by way of optoelectronic coupling elements and relayed to microprocessor 87 by way of inputs E 10 to E 15 of the second parallel input buffer 85.

Figure 6:
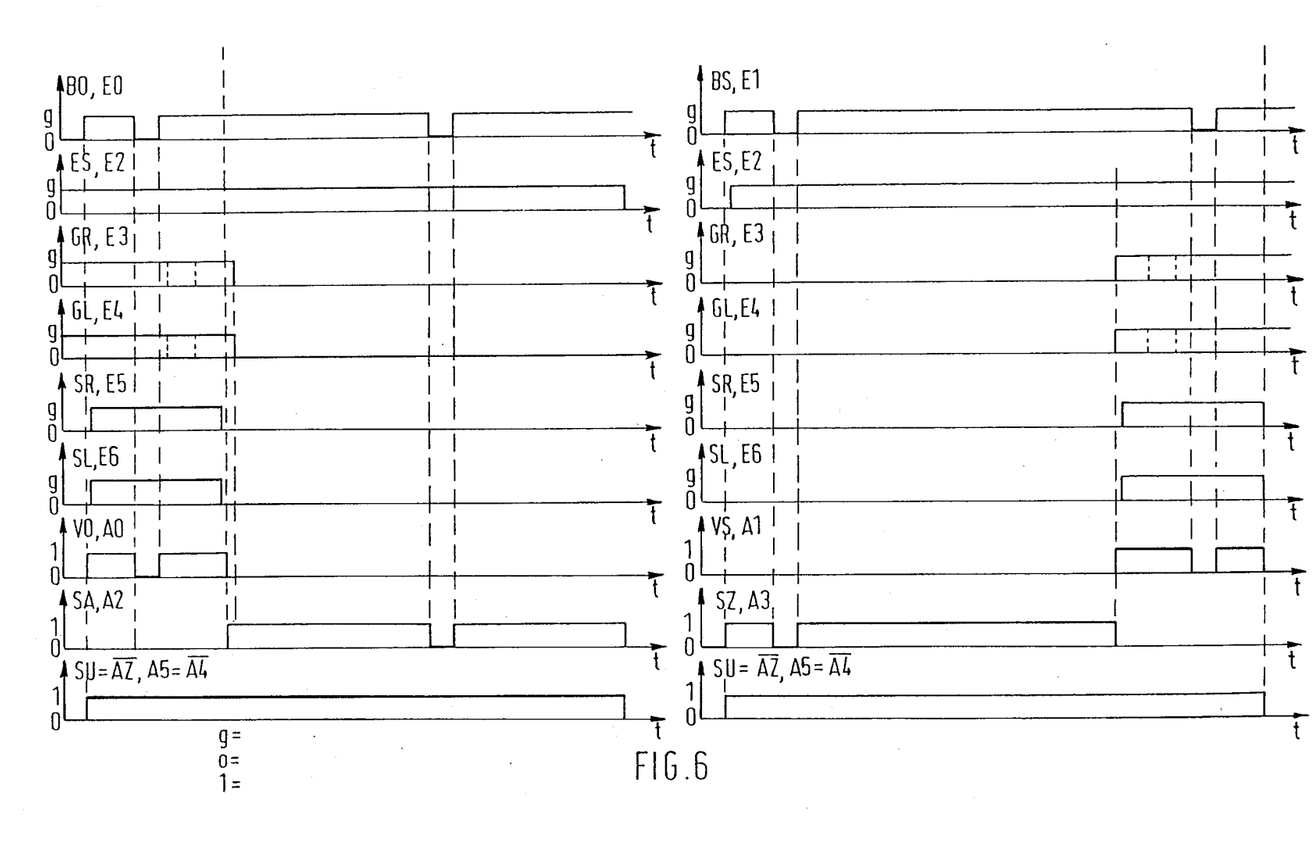
FIG. 6 shows two pulse diagrams illustrating the input and output signals of the logic circuit and of a microprocessor based system, respectively, during opening and closing of the top, respectively.

Finally, the pulse timing diagrams of FIG. 6 show the sequence of signals at the inputs and outputs of logic circuit 56 and, respectively, at the first parallel buffer 84 and output buffer 86, during the opening and closing of the top. It is furthermore possible for the optical and/or acoustic indicator 29 to be activated simultaneously with SU (AZ=SU) or A5, respectively, so that the indicator is actuated while the top has not as yet been entirely locked in place, or has not as yet been fully opened up, in which case, AND gate 78 is eliminated.

It should also be noted that, if position sensors 18 and 19 are designed to transmit different signals corresponding to the respective end positions (locked and/or unlocked, memory element 60 can be omitted. The logic circuit 56 is likewise simplified. However, in such a case, additional wires must be provided from the position sensors to control unit 12, and the position sensors become more expensive and require a larger amount of space.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Apparatus for opening and closing a convertible top for a motor vehicle of the type which includes locking means, disposed in a frame member of the top and cooperating with mounting means in a windshield frame of the motor vehicle, for locking the top in the fully closed position, comprising:

electric drive means for operably moving the convertible top to fully open, fully closed and intermediate positions;

electric means for operably moving the locking means to fully locked, fully unlocked and intermediate positions, and position sensing means for sensing at least one of said locked, unlocked and intermediate positions;

control means, connected to the electric drive means and to the electric and position sensing means of the locking means, for controlling operation of the electric drive means and the locking means, said control means including memory means for indicating a preceding or unlocking operation of the locking means;

limit switch means, located in proximity to the locking means and connected to the control means, for indicating to the control means that the top is in the fully closed position; terminal switch means for indicating to the control means that the top is in the fully open position; and a manual operating key for initiating unlocking, locking, opening, and closing operations;

said control means including processing means for processing signals from at least one of the manual operating key, the terminal switch means, the limit switch means, the position sensing means and the memory means, to produce control signals for controlling the operation of the top;

wherein said control means produces control signals for controlling the operation of the top such that closing of the top by the electric drive means is prevented unless the manual operating key is set at "close", and the position sensing means indicates that the locking means is in the fully unlocked position, and the limit switch means indicates that the top is not in the fully closed position, and the memory means indicates a preceding unlocking motion.

2. Apparatus according to claim 1, wherein said control means produces control signals for controlling the operation of the top such that locking and unlocking of the locking means is prevented when the top is not in the fully closed position, and such that operation of the electric drive means is prevented unless the locking means are in the fully unlocked position.

3. Apparatus according to claim 2, wherein said control means produces control signals for further controlling the operation of the top such that the locking and unlocking operations are interrupted when the fully locked and fully unlocked positions are reached, respectively, and such that the opening and closing of the top is interrupted when the fully open and fully closed positions are reached respectively, and wherein said operations are interruptible and/or reversible by the operator at any time by means of the manual operating key.

4. Apparatus according to claim 2, wherein said control means produces signals for further controlling the operation of the locking means such that, when the position sensing means indicate that the locking means is in one of the fully locked and fully unlocked positions, unlocking of the top frame member is prevented unless:
  the manual operating key is set at "open", and
  the limit switch means indicate that the top is in the fully closed position, and
  the memory means indicates a preceding locking operation.

5. Apparatus according to claim 2, wherein said control means produces control signals for further controlling the operation of the locking means such that, when the position sensing means indicate that the locking means is in one of the fully locked and fully unlocked positions, locking of the top frame member is prevented unless:
  the manual operating key is set at "close", and
  the limit switch means indicate that the top is in the fully closed position, and
  the memory means indicate a preceding unlocking operation.

6. Apparatus according to claim 2, wherein said control means produces control signals for further controlling the operation of the top such that opening of the top by the electric drive means is prevented unless:
  the manual operating key is set at "open", and
  the position sensing means indicate that the locking means is in the fully unlocked position, and
  the memory means indicate a preceding unlocking motion.

7. Apparatus according to claim 2, further comprising means for connecting an ignition switch of the vehicle to the control means.

8. Apparatus according to claim 2, further comprising a tachometer pulse generator, connected to the control means, for transmitting to the processing means pulses proportional to a driving speed of the vehicle.

9. Apparatus according to claim 2, wherein the control means includes means for controlling the operation of the top such that opening and closing of the top is prevented unless an ignition switch of the vehicle is in the accessory position.

10. Apparatus according to claim 2, wherein the control means includes means for controlling the operation of the top such that opening and closing of the top is prevented when the vehicle is moving at speeds greater than 3 km/hr.

11. Apparatus according to claim 1, wherein said position sensing means comprise cam disks which open an electrical contact when the locking means is in the fully locked and fully unlocked positions, and which close the electrical contact when the locking means is in the intermediate position.

12. Apparatus according to claim 1, further comprising indicator means for indicating to an operator at least one of a fully locked position of the locking means and a fully open position of the top.

13. Apparatus according to claim 12, wherein said indicating means comprises an optical indicator connected to and actuated by the control means.

14. Apparatus according to claim 12, wherein the indicating means comprises an acoustic indicator connected to and actuated by the control means.

15. Apparatus according to claim 1, further comprising indicating means for indicating to an operator at least one of an intermediate position of the locking means and an intermediate position of the top.

16. Apparatus according to claim 15, wherein the indicating means comprises an optical indicator connected to and actuated by the control means.

17. Apparatus according to claim 15, wherein the indicating means comprises an acoustic indicator connected to and actuated by the control means.

18. Apparatus according to claim 1, wherein said electric means for operably moving said locking means are actuated by the limit switch means.

19. Apparatus according to claim 1, wherein the electric drive means for operating the top comprises two mechanically coupled electric motors which are connected electrically in parallel.

20. Apparatus according to claim 1, wherein said control means includes means for preventing normal operation of the vehicle when the locking means is not in the fully locked position, and the top is not in the flly opened position.

21. Apparatus according to claim 20, wherein said means for preventing normal operation of the vehicle comprises switch means, connected to and actuated by the control means, for interrupting an ignition system of the vehicle.

22. Apparatus according to claim 1, wherein said control means comprises a logic circuit having a plurality of inputs and outputs, memory means for indicating a preceding locking or unlocking operation of the locking means, and power supply means for supplying operating current to individual components of the control means and for supplying load current to a plurality of devices connected to the inputs and outputs of the control means.

23. Apparatus according to claim 22, wherein input signals from a plurality of external sources are connected to the inputs of the logic circuit by coupling modules.

24. Apparatus according to claim 23, wherein said coupling modules comprise at least one of means for matching a signal to an input of the logic circuit, means for filtering an input signal, and means for eliminating contact bounce from an input signal.

25. Apparatus according to claim 22, further comprising a tachometer pulse generator connected to an input of the logic circuit by a serially connected retriggerable monostable multivibrator, low pass filter, and Schmitt trigger.

26. Apparatus according to claim 22, wherein the outputs of the logic circuit are connected, via noise suppressing circuits, to respective control inputs of output drive circuits which supply load current to devices connected to outputs of the control means in response to.signals at the respective outputs of the logic circuit.

27. Apparatus according to claim 26, wherein said output drive circuits short-circuit the respective outputs of the control means in response to signals at the respective outputs of the logic circuit.

28. Apparatus according to claim 26, wherein the output drive circuits connect the respective outputs of the control means to ground in response to signals at the respective outputs of the logic circuit.

29. Apparatus according to claim 22, wherein said memory means comprises an R-S flip-flop.

30. Apparatus according to claim 1, wherein said control means comprises a microprocessor means, input buffer means connected to the microprocessor means and connected to respective inputs of the control means by coupling modules, output buffer means connected to the microprocessor means and connected to respective control inputs of output drive circuits of the control means, and memory means connected to the microprocessor means.

31. Apparatus according to claim 1, wherein said position sensing means comprise a contact path and a contact element which is frictionally movable thereon, and wherein said contact path and said contact element open an electrical circuit when the locking means is in the fully locked and the fully unlocked positions, and close the electrical circuit when the locking means is in the intermediate position.

32. Apparatus according to claim 1, wherein each of said locking means is individually actuated by an adjacently disposed limit switch.

33. Apparatus for opening and closing a convertible top for a motor vehicle of the type which includes locking means, disposed in a frame member of the top and cooperating with mounting means in a windshield frame of the motor vehicle, for locking the top in the fully closed position, comprising:
   electric drive means for operably moving the convertible top to fully open, fully closed and intermediate positions;
   electric means for operably moving the locking means to fully locked, fully unlocked and intermediate positions, and position sensing means for sensing at least one of said locked, unlocked and intermediate positions;
   control means, connected to the electric drive means and to the electric and position sensing means of the locking means, for controlling operation of the electric drive means and the locking means, said control means including memory means for indicating a preceding locking or unlocking operation of the locking means;
   limit switch means, located in proximity to the locking means and connected to the control means, for indicating to the control means that the top is in the fully closed position;
   terminal switch means for indicating to the control means that the top is in the fully open position; and
   a manual operating key for initiating unlocking, locking, opening, and closing operations;
   said control means including processing means for processing signals from at least one of the manual operating key, the terminal switch means, the limit switch means, the position sensing means and the memory means, to produce control signals for controlling the operation of the top;
   wherein said control means produces control signals for controlling the operation of the top such that locking and unlocking of the locking means is prevented when the top is not in the fully closed position, and such that operation of the electric drive means is prevented unless the locking means are in the fully unlocked position; and
   wherein said control means produces control signals for further controlling the operation of the top such that the locking and unlocking operations are interrupted when the fully locked and fully unlocked positions are reached, respectively, and such that the opening and closing of the top is interrupted when the fully open and fully closed positions are reached, respectively, and wherein said operations are interruptible and/or reversible by the operator at any time by means of the manual operating key.

34. Apparatus according to claim 33, wherein said control means produces signals for further controlling the operation of the locking means such that, when the position sensing means indicate that the locking means is in one of the fully locked and fully unlocked positions, unlocking of the top frame member is prevented unless:
   the manual operating key is set at "open", and
   the limit switch means indicate that the top is in the fully closed position, and
   the memory means indicates a preceding locking operation.

35. Apparatus according to claim 33, wherein said control means produces control signals for further controlling the operation of the locking means such that, when the position sensing means indicate that the locking means is in one of the fully locked and fully unlocked positions, locking of the top frame member is prevented unless:
   the manual operating key is set at "close", and
   the limit switch means indicate that the top is in the fully closed position, and
   the memory means indicate a preceding unlocking operation.

36. Apparatus according to claim 33, wherein said control means produces control signals for further controlling the operation of the top such that opening of the top by the electric drive means is prevented unless:
   the manual operating key is set at "open", and
   the position sensing means indicate that the locking means is in the fully unlocked position, and
   the memory means indicate a preceding unlocking motion.

37. Apparatus according to claim 33, wherein said control means produces control signals for controlling the operation of the top such that closing of the top by the electric drive means is prevented unless:
   the manual operating key is set at "close", and
   the position sensing means indicates that the locking means is in the fully unlocked position, and
   the limit switch means indicate that the top is not in the fully closed position, and the memory means indicate a preceding unlocking motion.

* * * * *